H. J. HENNESSY.
COTTER PIN.
APPLICATION FILED JUNE 23, 1916.

1,248,655.

Patented Dec. 4, 1917.

Witnesses:
J. H. Svenson
Mac Carter

Inventor
Hilary J. Hennessy

UNITED STATES PATENT OFFICE.

HILARY J. HENNESSY, OF ST. PAUL, MINNESOTA.

COTTER-PIN.

1,248,655.  Specification of Letters Patent.  Patented Dec. 4, 1917.

Application filed June 23, 1916. Serial No. 105,404.

*To all whom it may concern:*

Be it known that I, HILARY J. HENNESSY, a citizen of the United States, residing at St. Paul, in the county of Ramsey and State of Minnesota, have invented certain new and useful Improvements in Cotter-Pins, of which the following is a specification, reference being given therein to the accompanying drawing.

My invention relates particularly to bolts in machines, etc., with nuts so applied that on account of vibration or shocks having a tendency to loosen the nut on the bolt, it is necessary to secure the same in a practical way.

The object of my invention is to provide a cotter pin to prevent the nut from turning off from bolt.

With the preceding and other objects in view, the invention consists of the novel design to be described, illustrated and claimed.

Reference will now be had to the accompanying drawings forming part of this specification. The same reference characters designate corresponding parts in the several views in which Figure 1 shows a bolt "*b*" and nut "*c*" securing plates "*e*" to each other, with the cotter pin "*a*" in place.

Figure 3:
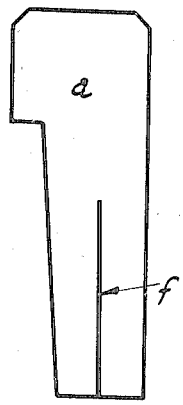
Fig. 3 shows a cotter pin "*a*" with the metal sheared at "*f*" forming depending legs.
Figure 1:
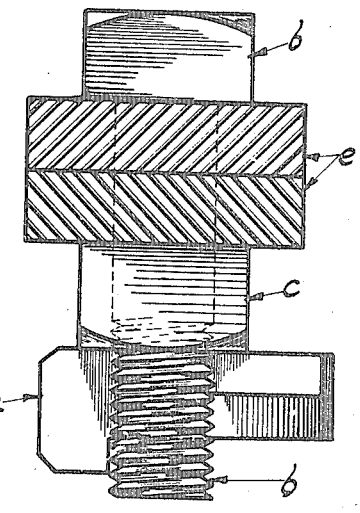
Figure 4:
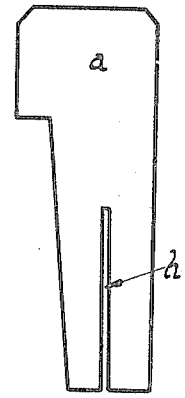
Fig. 4 shows a cotter pin "*a*" with the metal cut out making a straight slot at "*h*" forming depending legs.
Figure 5:
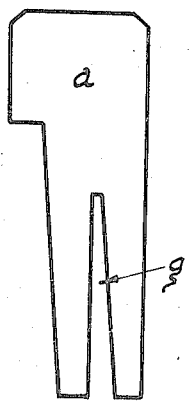
Fig. 5 shows a cotter pin "*a*" with the metal cut out making a tapered slot at "*g*" forming depending legs.
Figure 2:
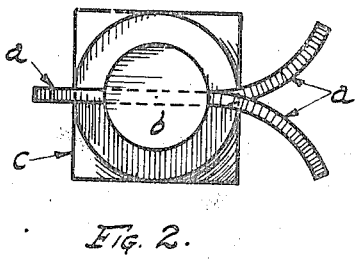
Fig. 2 is a bottom plan of Fig. 1 showing method of bending outward in opposite directions, the depending legs of the cotter pin "*a*".
Figure 6:
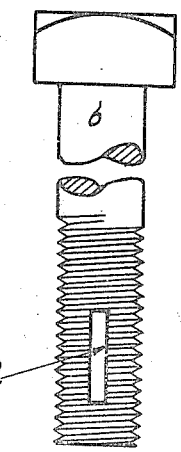

Fig. 6 shows a bolt "*b*" slotted at "*d*" to receive the cotter pin "*a*". After tightening up nut "*c*" cotter pin "*a*" is placed in slot "*d*" in bolt "*b*" the depending legs of said cotter pin extending through bolt "*b*" and being bent in opposite directions, holding said cotter pin in slot "*d*" in bolt "*b*" and preventing the nut "*c*" from becoming loose, but making the disassembling an easy matter for a mechanic.

While in the drawings forming a part of this application there are illustrated the preferred embodiments of my invention, it is to be understood that the design therein can be varied or changed as to shape, proportion and exact manner of assemblage, without departing from the spirit of the invention.

Having designated and described the several pins and the uses thereof, sufficiently clear to enable those skilled in the art to thoroughly understand the same, what I claim and desire to secure by Letters Patent is:

A cotter pin consisting of a flat piece of metal having a lateral projection on one end, the other end being divided longitudinally to form legs, the legs being adapted to be bent in opposite directions in planes parallel to the plane of the division.

In testimony whereof, I affix my signature in the presence of two witnesses.

HILARY J. HENNESSY.

Witnesses:
T. J. M. SWENSON,
MAE CARTER.